Patented Dec. 22, 1953

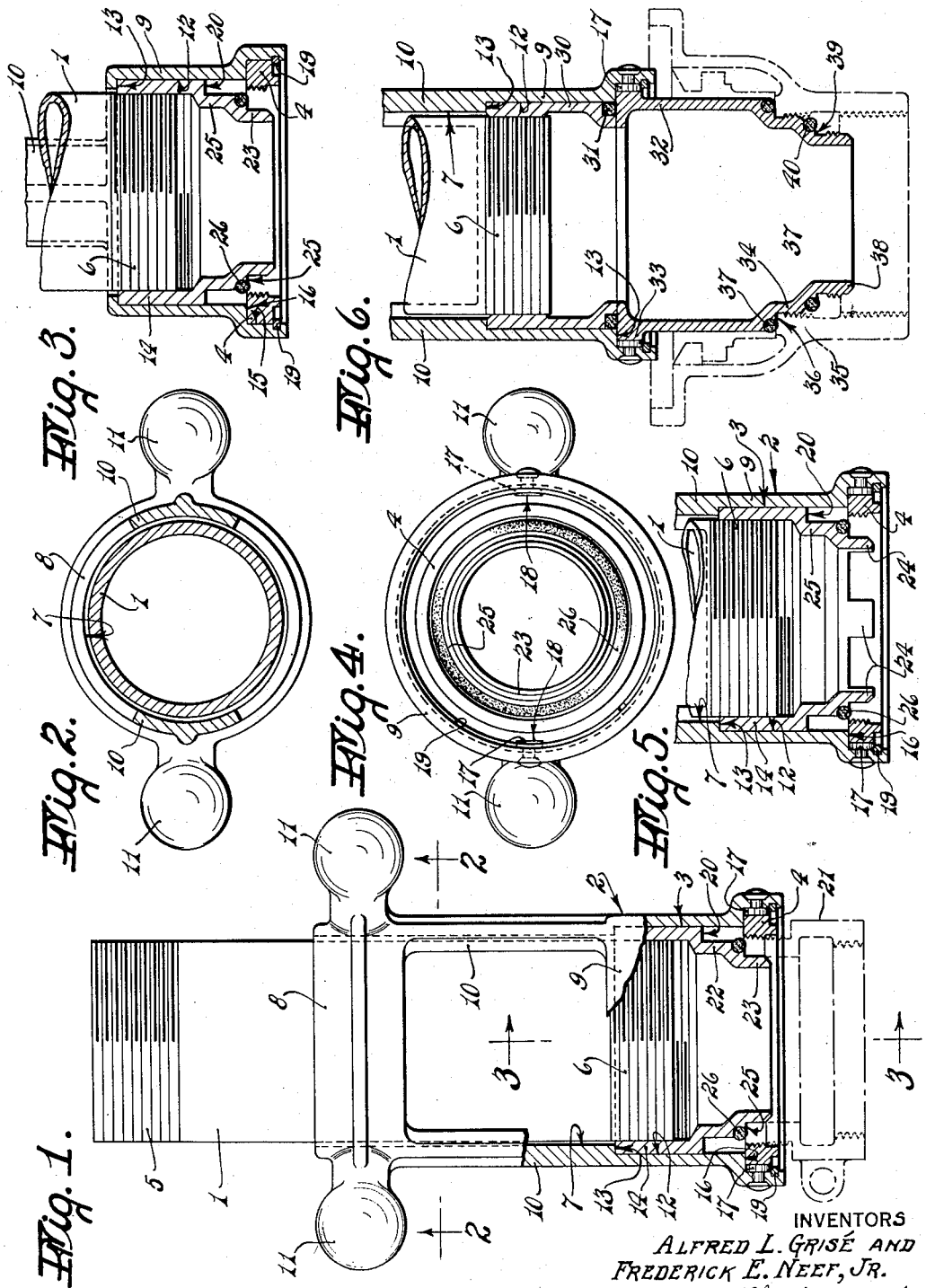

2,663,581

UNITED STATES PATENT OFFICE 2,663,581

SWIVEL PIPE COUPLING

Alfred L. Grisé, Springfield, and Frederick E. Neef, Jr., Longmeadow, Mass., assignors to Gilbert & Barker Manufacturing Company, West Springfield, Mass., a corporation of Massachusetts Application June 3, 1950, Serial No. 165,942

2 Claims. (Cl. 285—122)

This invention relates to improvements in swivel pipe couplings. The invention, while capable of general application, finds one advantageous use as a means for connecting the delivery hose of a gasoline tank wagon to the fill pipe connection of a storage tank in liquid-tight fashion. A connection of this kind, as distinguished from a loose slip-type connection with the fill pipe, enables much speedier deliveries of the gasoline, a substantial reduction in the transfer loss and the substantial elimination of the fire hazard.

The fill pipes of gasoline storage tanks vary in form and size. In some cases, the fill pipe is a plain pipe extending upwardly from the storage tank with its upper end projecting above ground and closed by a cap, except during the filling operation. In other cases, the fill pipe may consist of a portion of a fill box, which is sunk into the ground and has a cover that is removable to gain access to the pipe. In the first case, the pipe is usually threaded externally and in the second case, it is usually threaded internally. The term "fill pipe" is used generically to include any threaded conduit or passage to which the coupling may be connected.

This invention has for its object the provision of a swivel pipe coupling for the purpose described having a tube for connection at one end to the hose or other delivery conduit and a swivel body mounted on the tube, the tube and body constructed to receive coupling members of different forms and sizes to adapt the coupling for liquid-tight connection to fill pipes of various forms and sizes.

The invention will be disclosed with reference to the illustrative examples shown in the accompanying drawings, in which:

Fig. 1 is an elevational view with parts broken away and in section of one form of swivel coupling member embodying the invention and adapted for connection to externally threaded fill pipes;

Figs. 2 and 3 are sectional views taken on the lines 2—2 and 3—3, respectively, of Fig. 1;

Fig. 4 is a bottom plan view of the coupling member;

Fig. 5 is a fragmentary sectional view showing a modification in one of the coupling elements of Fig. 1; and Fig. 6 is a fragmentary sectional view showing another form of coupling member adapted for connection to internally threaded fill pipes.

Referring to these drawings and first to Fig. 1, the coupling involves a hollow, cylindrical, fluid-conducting tube 1, adapted at one end for attachment in any suitable way to a fluid supply conduit, such as for example a hose, a swivel body 2 rotatably mounted on the tube 1, and inner and outer members, such as 3 and 4, which are respectively secured to the tube 1 and body 2. These members are in the form of removable inserts so that they may be provided in the various forms and sizes needed to adapt the coupling to connect with fill pipes of various kinds and sizes and readily substituted one for another in the coupling elements 1 and 2. These members 3 and 4 function, as will later appear, to effect fluid-tight connection with the fill pipe to be serviced.

The tube 1 is screw threaded at opposite ends, as shown at 5 and 6. The end 5, as described, may be connected in any suitable way to the service hose or other supply conduit. The swivel body 2 has a cylindrical bore 7 to rotatably fit the exterior cylindrical surface of tube 1 and is rotatably mounted thereon. In the particular form shown, this body has upper and lower tubular portions 8 and 9, rigidly and integrally connected in axially-spaced relation by a plurality of bars 10 (see also Fig. 2). This construction is solely for the purpose of saving metal and reducing weight. The upper portion 8 has handles 11 thereon, whereby the body 2 may conveniently be turned, while the tube 1 and hose remain stationary.

The swivel body 2, or more particularly the lower portion 9 thereof, has a first counterbore 12 and a shoulder 13 at the intersection of such counterbore with bore 7. This counterbore rotatably receives an upper cylindrical portion 14 of the inner tubular, fluid-conducting member 3, which is screwed on the threaded end 6 of tube 1 and the inner end face of which is adapted to engage and seat upon the shoulder 13. There is a second counterbore 15 in the portion 9 and a shoulder 16 at the intersection of the two counterbores. The outer member 4 has a cylindrical portion to fit the second counterbore and an inner end face to seat on the shoulder 16. A key 17 is fixed to the portion 9 and projects radially into the second counterbore 15, being received in a suitable notch 18 in the exterior periphery of the outer member 4, whereby to prevent relative rotation of the swivel body 2 and outer member 4. There may be more than one of these keys, if necessary or desired, and two are shown herein. A groove is provided in the second counterbore 15 to receive a snap ring 19, which also engages the outer end face of member 4 to hold it in its seat against the shoulder 16. It will be noted that the outer member 4 has a portion of its inner end face projecting into the first counterbore 12 and that the inner member 3 has an outer end face 20 in the path of such projecting part of the outer member, whereby the axial movement of the swivel body 2 on tube 1 is limited by the abutment of the inner and outer end faces of the inner member 3 with the shoulder 13 and the inner end face of the outer member 4.

The inner and outer members 3 and 4, as will be clear, are readily removable from tube 1 and body 2 so that other members of different sizes and forms may be substituted when necessary. In Fig. 1, the outer member 4 is interiorly screw threaded and forms a nut adapted to be screwed on the externally threaded end of a fill pipe, such as shown at 21, when the swivel body 2 is rotated. The inner member 3 has a portion 22 extended from, and of less diameter than, the portion 14 and, extended from the portion 22 is a pilot portion 23 of less diameter than the portion 22. The pilot portion 23 is adapted to enter pipe 21 and approximately center the coupling on the pipe so that the threads on the nut 4 can be caught and engaged with the threads on pipe 21. This pilot portion may be completely tubular as shown in Fig. 1 or in the form of angularly spaced fingers, such as are shown at 24 in Fig. 5. At the intersection of the portions 22 and 23 or 24, as the case may be, there is an annular shoulder 25 to overlie the end face of pipe 21. Shoulder 25 is grooved to receive a suitable packing ring, such as the O-ring 26. The inner member 3 has a certain amount of axial play in the swivel body 2, enough to allow the body and the nut-like outer member 4 to advance along the screw threads of the fill pipe 21, after the packing 26 on the shoulder 25 of the inner member has engaged the end face of the fill pipe. The axial movement of the inner member is limited by the first shoulder 13 and the inner face of the outer member 4 which are adapted to respectively engage the inner and outer end faces of the first portion 14 of the inner member 3.

Another form of the invention is shown in Fig. 6. Here, different forms of insert members are used with the same tube 1 and swivel body 2. The inner member, designated 30, is, as before, a hollow, cylindrical, fluid-conducting member but its axial length is substantially equal to the axial length of the first counterbore 12 and its outside diameter is uniform from end to end, except for a groove at its outer end, which receives a suitable packing ring, such as the O-ring 31. The upper end of the inner member 30, is, as before, threaded on the lower threaded end 6 of tube 1 and its inner end face engages the first shoulder 13. The outer member, marked 32, is also a hollow, cylindrical, fluid-conducting member. It has at its upper end an annular flange 33 to fit into the second counterbore 15 and seat against shoulder 16. The flange 33 is held in its seat in the second counterbore by the snap ring 18. The inner end face of the outer member 32 abuts the outer end face of the inner member 30 and compresses the packing ring 31, whereby to seal the joint between the two tubular fluid-conducting members. The outer member has a portion 34 of reduced diameter exteriorly screw threaded to screw into a fill pipe, such as 35. A shoulder 36 is provided on the outer member at its intersection with the screw threaded portion 34. This shoulder is grooved to receive a packing ring 37. When the portion 34 is screwed into pipe 35, packing 37 is compressed to seal the joint between the end face of pipe 35 and the overlying shoulder 36.

If desired, there may be more than one screw threaded portion on the lower end of the outer member 32. A second such portion 38, smaller in diameter than the portion 34, is provided as well as a shoulder 39 grooved to carry a packing ring 40. The portion 38 is designed to screw into a fill pipe of smaller diameter than pipe 35 and the shoulder 39 to overlie and engage the end face of this smaller pipe with the ring 40, sealing the joint between the abutting end faces.

In use, the inner and outer coupling members may be quickly and easily removed from the tube 1 and the swivel body 2 and other inner and outer coupling members of different form or of different size substituted. Removal of the snap ring 18 allows the outer member to drop out, and then the swivel body 2 may be pushed back on tube 1 far enough to expose the inner member, which may then be unscrewed from tube 1. The two general types of coupling members have been shown in Figs. 1 and 6. They may, of course, be provided in many different sizes as needed. With a variety of inner and outer coupling members to use interchangeably with the elements 1 and 2, service connection can be made with all the various kinds and sizes of fill pipes usually encountered.

In the operation of the Fig. 1 form of the invention, the operator will grasp the handles 11 and these will rise carrying the body 2 upwardly until the inner face of outer member 4 abuts the outer face of inner member 3. The nut-like member 4 will be drawn upwardly, exposing the pilot tube 23 or the pilot fingers 24, as the case may be. The operator will maneuver the coupling until the pilot 23 or 24 enters the upper end of the fill pipe and the shoulder 25 is supported on the upper end face of the fill pipe. Then, the swivel body 2 will be moved downwardly until member 4 encircles the upper end of the fill pipe, whereupon the body 2 is turned to thread member 4 on the fill pipe. When the member 4 has been threaded on the fill pipe as far as possible, the shoulder 13 will have forced the inner member toward the fill pipe and compressed the packing 26 against the upper end of such pipe to provide a leak-tight joint. With this arrangement the packing 26 is compressed without rotation of either of the two surfaces between which it is compressed.

With the Fig. 6 form of the invention, the outer member has an externally threaded portion which projects beyond the body 2 and is readily inserted in the threaded hole in the fill box, the body 2 then being rotated to screw this portion in the hole until a tight connection is obtained.

The invention thus provides an improved swivel pipe coupling which is constructed to interchangeably receive various forms and sizes of coupling members needed to service storage tanks having various kinds and sizes of fill pipes

What is claimed is:

1. A swivel pipe coupling, comprising, a fluid-conducting tube having its inlet end adapted for connection to a fluid-supply conduit and its outlet end exteriorly screw threaded, a swivel body having a main bore in which a portion of the exterior of said tube is rotatably engaged, said body having a first counterbore and a first shoulder at the intersection of the latter with the main bore; an inner tubular fluid-conducting member communicating at its inner end with the outlet end of said tube and having an external cylindrical portion rotatably and slidably engaged in the first counterbore, a first annular face at its inner end adapted to engage said shoulder, a second annular face axially spaced from the first annular face by a distance less than the length of the first counterbore, and an internally screw threaded portion at said end threaded on the externally screw threaded outlet end of said tube; said body having a second counterbore and a second shoulder at the intersection of the first and second counterbores, an outer tubular fluid-conducting member communicating at its inner end with the outer end of the inner member and having an external cylindrical portion engaged in the second counterbore and an inner annular end face abutting the second shoulder and projecting into the first counterbore in position to engage the second annular face of the inner member and limit the relative sliding movement between said inner member and swivel body, interengaging means on said swivel body and outer member to hold the same against relative rotation and axial movement, the outer member having a screw threaded portion adapted for connection with the screw threaded portion of a fill pipe to be serviced when the swivel body is rotated, and a packing ring on one of said members adapted for sealing engagement with the end face of the fill pipe.

2. A swivel coupling, as set forth in claim 1, in which the inner member has a second cylindrical portion of less diameter than the first counterbore and the inside diameter of the outer member and a third cylindrical portion of less diameter than the second cylindrical portion and a shoulder at the intersection of the second and third cylindrical portions, said third cylindrical portion forming a pilot adapted to enter the fill pipe to align the screw threaded portion of the outer member with the screw threaded portion of the fill pipe, and the packing ring being located on the last-named shoulder and adapted to be drawn by the engagement of the first shoulder of the swivel body with the first annular face of the inner member into engagement with the end face of the fill pipe when the swivel body is rotated to advance the screw threaded outer member along the screw threads of the fill pipe.

ALFRED L. GRISÉ.
FREDERICK E. NEEF, Jr.

References Cited in the file of this patent
UNITED STATES PATENTS

| Number | Name | Date |
|---|---|---|
| 930,984 | McGrath et al. | Aug. 10, 1909 |
| 1,016,620 | Gapp | Feb. 6, 1912 |
| 1,638,224 | Vandergrift | Aug. 9, 1927 |

FOREIGN PATENTS

| Number | Country | Date |
|---|---|---|
| 239,809 | Switzerland | Mar. 16, 1946 |